United States Patent
Scipio et al.

(10) Patent No.: US 10,156,192 B2
(45) Date of Patent: Dec. 18, 2018

(54) GAS TURBINE ENGINE WITH A MULTIPLE FUEL DELIVERY SYSTEM

(71) Applicant: General Electric Company, Schenectady, NY (US)

(72) Inventors: Alston Ilford Scipio, Mableton, GA (US); Paul Robert Fernandez, Atlanta, GA (US); Thomas John Freeman, Marietta, GA (US); Sanji Ekanayake, Atlanta, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1283 days.

(21) Appl. No.: 13/645,536

(22) Filed: Oct. 5, 2012

(65) Prior Publication Data

US 2014/0096827 A1 Apr. 10, 2014

(51) Int. Cl.
*F02C 9/40* (2006.01)

(52) U.S. Cl.
CPC .......... *F02C 9/40* (2013.01); *Y02E 50/12* (2013.01); *Y10T 137/0318* (2015.04); *Y10T 137/85938* (2015.04)

(58) Field of Classification Search
CPC ............. F02C 7/228; F02C 7/236; F02C 9/40
See application file for complete search history.

(56) References Cited

U.S. PATENT DOCUMENTS

| | | | |
|---|---|---|---|
| 5,560,710 A * | 10/1996 | Klocke | B01D 53/56 366/336 |
| 7,458,998 B2 * | 12/2008 | Copeland et al. | 44/308 |
| 7,861,696 B2 * | 1/2011 | Lund | 123/525 |
| 7,964,000 B2 | 6/2011 | Selvidge | |
| 8,183,419 B2 | 5/2012 | Lamprecht et al. | |
| 8,350,069 B2 * | 1/2013 | Davies et al. | 554/124 |
| 8,430,360 B2 * | 4/2013 | Schwarze et al. | 244/135 R |
| 8,621,870 B2 * | 1/2014 | Carroni | F23R 3/286 60/225 |
| 8,650,851 B2 * | 2/2014 | Ouellet et al. | 60/39.281 |
| 2006/0248894 A1 * | 11/2006 | Hiramoto et al. | 60/772 |
| 2009/0253948 A1 | 10/2009 | McCall et al. | |
| 2010/0264162 A1 * | 10/2010 | Cratensburg et al. | 222/1 |
| 2011/0126448 A1 * | 6/2011 | Dumenil | 44/307 |
| 2011/0289897 A1 | 12/2011 | Fujita et al. | |
| 2013/0340324 A1 * | 12/2013 | Swann | 44/307 |
| 2013/0343958 A1 * | 12/2013 | Swann | 422/111 |

OTHER PUBLICATIONS

U.S. Appl. No. 13/366,859, filed Feb. 6, 2012, Poole, et al.
U.S. Appl. No. 13/602,545, filed Sep. 4, 2012, Scipio, et al.

* cited by examiner

*Primary Examiner* — Arun Goyal

(74) *Attorney, Agent, or Firm* — Eversheds Sutherland (US) LLP

(57) ABSTRACT

The present application provides a multiple fuel delivery system for use with a gas turbine engine. The multiple fuel delivery system may include a first fuel tank with a first fuel therein, a second fuel tank with a second fuel therein, a mixing chamber, and a flow divider downstream of the mixing chamber. The first fuel tank may be in communication with the mixing chamber via a first fuel pump and the second fuel tank may be in communication with the mixing chamber via a second fuel pump.

12 Claims, 3 Drawing Sheets

--Prior Art--

GAS TURBINE ENGINE WITH A MULTIPLE FUEL DELIVERY SYSTEM

TECHNICAL FIELD

The present application and the resultant patent relate generally to gas turbine engines and more particularly relate to a gas turbine engine with a multiple fuel delivery system such that the gas turbine engine may operate on multiple fuels and blends thereof.

BACKGROUND OF THE INVENTION

Heavy duty gas turbine engines may operate on a number of different fuels. The fuels may range from heavy oils, naphtha, distillate, flare gas, syngas, landfill gas, natural gas, and other types of fuels and/or blends thereof. Power plants thus may have gas turbine engines with dual fuel capability and may operate on, for example, diesel and natural gas, depending upon availability, price, and other operational parameters.

Given significant fluctuations in the price of petroleum-based fuels, there is an interest in increasing the use of alternative fuels and blends thereof. For example, naphtha and the like are generally considered to be lower cost alternative fuels. Viscosity differences, however, between naphtha and diesel fuels may make it challenging to convert existing combustion systems to use naphtha. Similarly, various types of biofuels are also in increased use. Biofuels and diesel fuels, however, generally must be premixed before combustion. Such blends may be premixed in a number of different techniques that provide little flexibility in altering the specified proportions.

There is thus a desire for systems and methods for the accurate preparation and delivery of multiple fuels and blends thereof to a gas turbine engine. Such systems and methods may provide fuel flexibility for the gas turbine engine to operate on multiple fuels and any type of blends thereof.

SUMMARY OF THE INVENTION

The present application and the resultant patent thus provide a multiple fuel delivery system for use with a gas turbine engine. The multiple fuel delivery system may include a first fuel tank with a first fuel therein, a second fuel tank with a second fuel therein, a mixing chamber, and a flow divider downstream of the mixing chamber. The first fuel tank may be in communication with the mixing chamber via a first fuel pump and the second fuel tank may be in communication with the mixing chamber via a second fuel pump.

The present application and the resultant patent further provide a method of operating a multiple fuel delivery system for a gas turbine engine. The method may include the steps of providing a volume of a first fuel, providing a volume of a second fuel, selecting a ratio of the first fuel and the second fuel, pumping the ratio of the first fuel and the second fuel to a mixing chamber to create a blended flow, and pumping the blended flow to a flow divider for combustion in the gas turbine engine.

The present application and the resultant patent further may provide a multiple fuel delivery system for use with a gas turbine engine. The multiple fuel delivery system may include a first fuel tank with a first fuel therein, a second fuel tank with a second fuel therein, a mixing chamber with one or more angled counter flow nozzles so as to create a blended flow, and a flow divider downstream of the mixing chamber. The first fuel tank may be in communication with the mixing chamber via a first fuel pump and the second fuel tank may be in communication with the mixing chamber via a second fuel pump. The flow divider may provide the blended flow to a number of combustor cans of the gas turbine engine.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
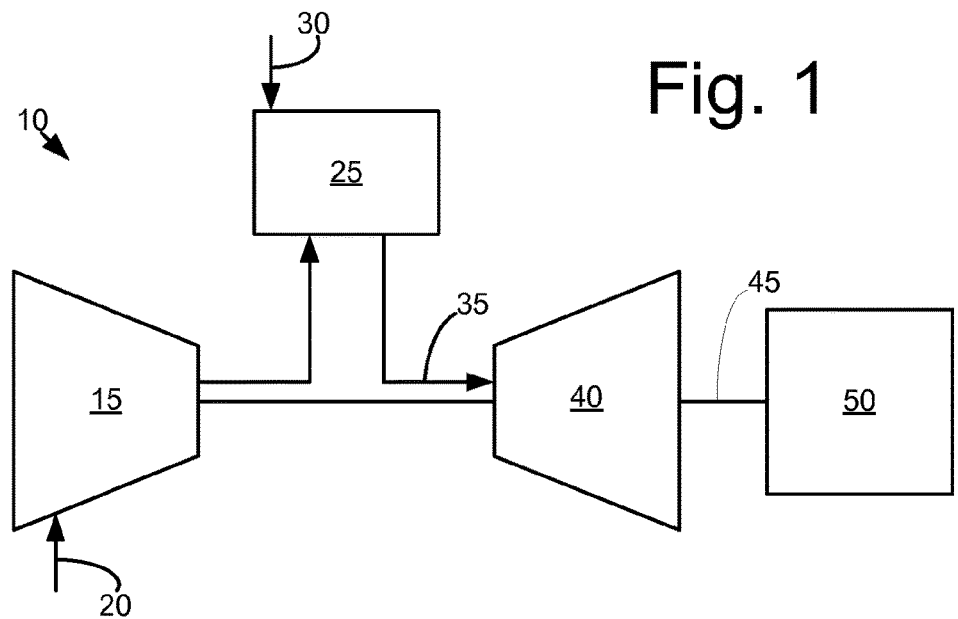
FIG. 1 is a schematic view of a gas turbine engine showing a compressor, a combustor, a turbine, and a load.

Referring now to the drawings, in which like numerals refer to like elements throughout the several views, FIG. 1 shows a schematic view of gas turbine engine 10 as may be used herein. The gas turbine engine 10 includes a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of combustion gases 35. Although only a single combustor can 25 is shown, the gas turbine engine 10 may include any number of combustor cans 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, diesel fuels, various types of syngas, and/or other types of fuels. The gas turbine engine 10 may be any one of a number of different gas turbine engines offered by General Electric Company of Schenectady, N.Y., including, but not limited to, those such as a frame-7 or a frame-9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
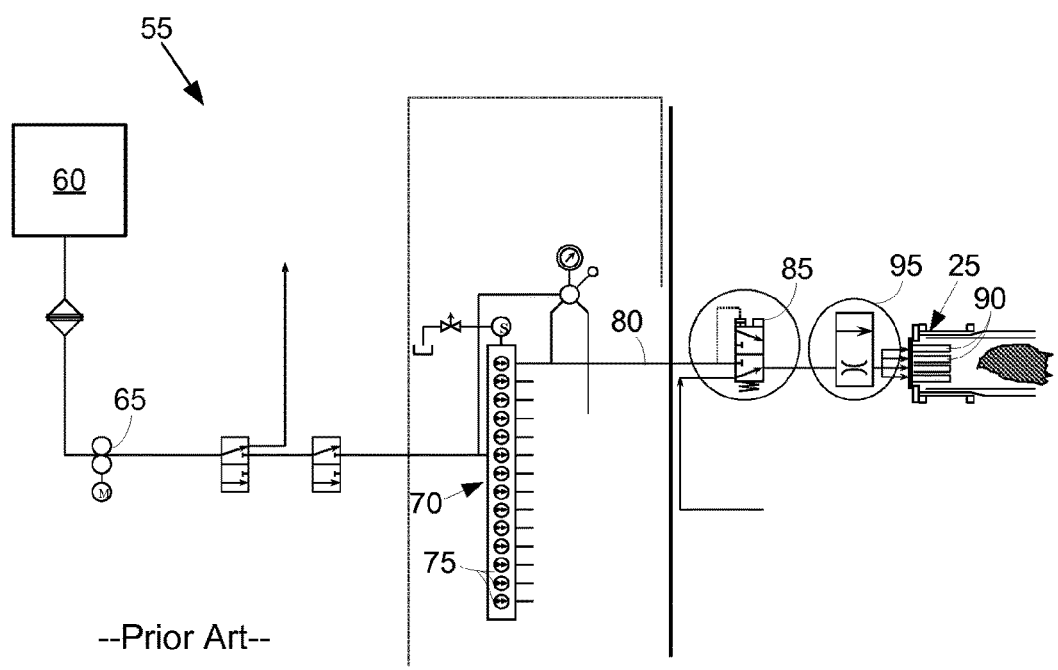
FIG. 2 is a schematic view of a fuel delivery system for use with a combustor.

FIG. 2 shows a fuel delivery system 55 that may be used with the combustor 25. When using a fuel blend, such as a diesel fuel and naphtha, the fuels may be pre-mixed in a mixing tank 60 or elsewhere. The blended fuel may be pumped by a fuel pump 65 to a flow divider 70. The flow divider 70 may divide the flow of fuel according to the number of combustor cans 25 in use. The flow divider 70 may include a number of manifolds 75 and a number of outgoing fuel lines 80 in communication with the combustor cans 25. The flow of fuel may be mixed with a number of other flows in a three-way valve 85 and the like and distributed to a number of the fuel nozzles 90 within the combustor cans 25 via a distribution valve 95 and the like. The fuel delivery system 55 described herein is for the purpose of example only. Many other types and configurations of fuel delivery systems may be known.

Figure 3:
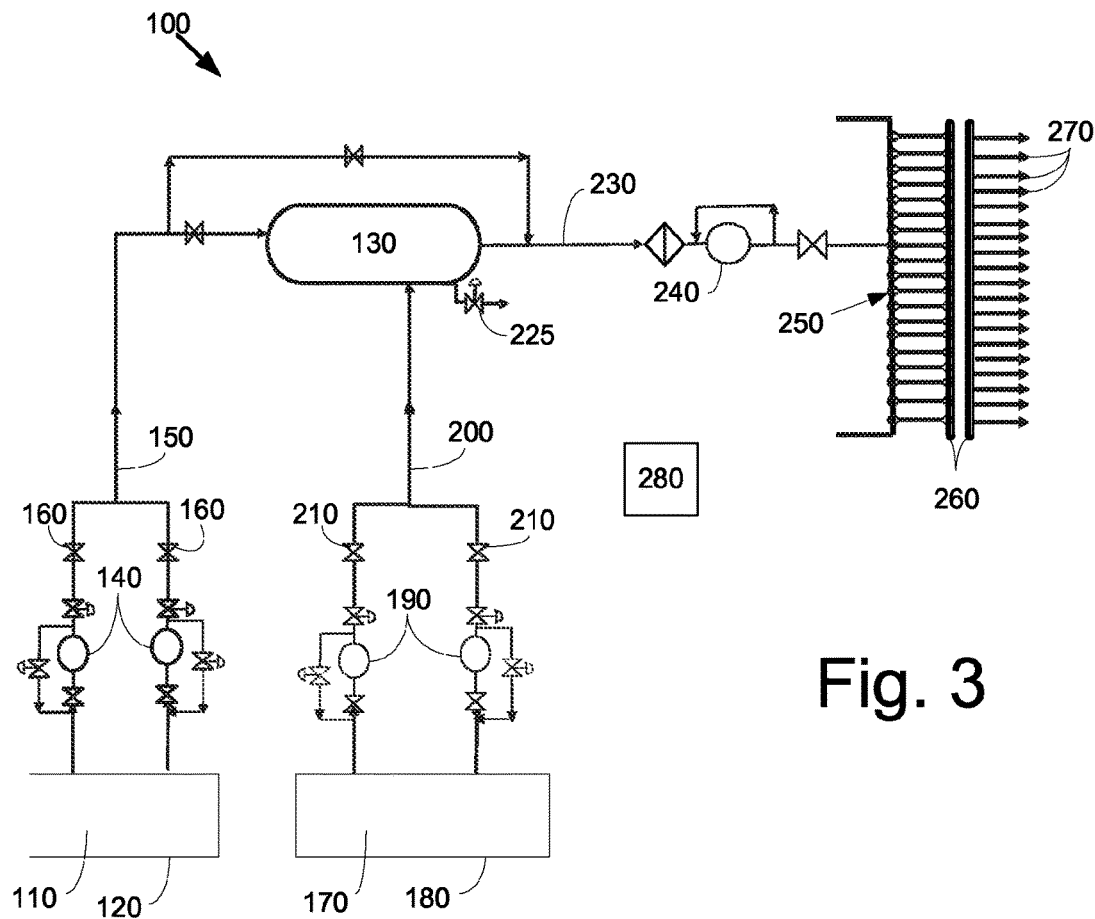
FIG. 3 is a schematic view of a multiple fuel delivery system as may be described herein.

FIG. 3 shows a multiple fuel delivery system 100 as may be described herein. The multiple fuel delivery system 100 may include a first fuel tank 110. In this example, the first fuel tank 110 may include a volume of a diesel fuel 120 therein. The diesel fuel 120 may be a number two diesel fuel and the like. Other types of fuels may be used herein. The first fuel tank 110 may have any suitable size, shape, or configuration. The first fuel tank 110 may be in communication with a mixing chamber 130. The first fuel tank 110 may be in communication with the mixing chamber 130 via one or more first fuel pumps 140 and one or more first fuel lines 150. The first fuel pumps 140 may be of conventional design. A number of first fuel line isolation valves 160 also may be used on the first fuel lines 150. Other components and other configurations may be used herein.

The multiple fuel delivery system 100 also may include a second fuel tank 170. The second fuel tank 170 may have a volume of a biodiesel fuel 180 therein. Other types of fuels may be used herein. The second fuel tank 170 may have any suitable size, shape, or configuration. The second fuel tank 170 may be in communication with the mixing chamber 130 via one or more second fuel pumps 190 positioned on one or more second fuel lines 200. The second fuel pumps 190 may be of conventional design. A number of second fuel line isolation valves 210 also may be used on the second fuel lines 200. Other components and other configurations may be used herein.

Figure 4:
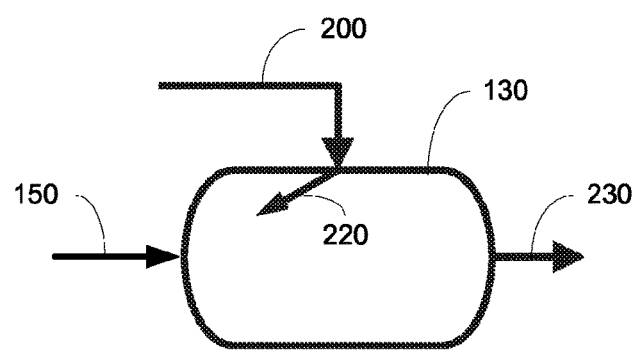
FIG. 4 is a schematic view of a mixing chamber as may be used in the multiple fuel delivery system of FIG. 3.

FIG. 4 shows an example of the mixing chamber 130. The mixing chamber may include a number of angled counter flow nozzles 220 for the flow of the biodiesel fuel 180 or other type of secondary flow. The flow of the biodiesel fuel 180 may be injected at an angle via the angled counter flow nozzles 220 into the incoming flow of diesel fuel 120 or other type of primary flow for good mixing therein without the use of moving parts. Good mixing also may be provided by injecting the flow of biofuel diesel 180 at a higher pressure as compared to the flow of diesel fuel 120. The mixing chamber 130 may have any size, shape, or configuration. A mixing chamber valve 225 may be positioned about the mixing chamber to allow draining thereof.

A blended flow 230 thus may exit the mixing chamber 130. The blended flow 230 may be pumped by a main fuel pump 240 to a flow divider 250. As described above, the flow divider 250 may include a number of manifolds 260 and a number of outgoing fuel lines 270. The outgoing fuel lines 270 may be in communication with the combustor cans 25 for combustion as described above. Other components and other configurations may be used herein.

The multiple fuel delivery system 100 may be operated via a fuel optimization controller 280. The fuel optimization controller 280 may provide the requested fuel to the combustor cans 25 as well as the appropriate proportions for the blends thereof. The proportions may be based on a predetermined schedule or may be varied based upon operating conditions and other types of parameters. The fuel optimization controller 280 may be any type of programmable logic device and may be in communication with the overall control system for the gas turbine engine.

In use, if one hundred percent (100%) of the diesel fuel 120 is requested, the fuel optimization controller 280 may instruct the first fuel pump 140 to pump the diesel fuel 120 to the mixing chamber 130 and may instruct the main fuel pump 240 to pump the diesel fuel 120 to the flow divider 250. Likewise, if one hundred percent (100%) of the biodiesel fuel 180 is requested, then the fuel optimization controller 280 may instruct the second fuel pump 190 to pump the biodiesel fuel 180 to the mixing chamber 130 and may instruct the main fuel pump 240 to pump the biodiesel fuel 180 to the flow divider 250.

If a blend of fuels is requested, the fuel optimization controller 280 may select the appropriate proportions based upon predetermined ratios or other parameters. The fuel optimization controller 280 may instruct the first fuel pump 140 to pump the appropriate volume of the diesel fuel 120 to the mixing chamber 130 and may instruct the second fuel pump 190 to pump the appropriate volume of the biodiesel fuel 180 to the mixing chamber 130. The diesel fuel 120 and the biodiesel fuel 180 may be mixed within the mixing chamber 130 with the aid of the angled counter flow nozzles 220. The resultant blended flow 230 may be a homogeneous mixture of the fuels in the requested ratio. The fuel optimization controller 280 may instruct the main fuel pump 240 to pump the blended flow 230 to the flow divider 250 for combustion in the combustion cans 25. The multiple fuel delivery system 100 thus may provide any ratio of the respective fuels from about zero percent (0%) to one hundred percent (100%), i.e., B20 (twenty percent (20%) biodiesel fuel 180 and eighty percent (80%) diesel fuel 120, B30 (thirty percent (30%) biodiesel fuel 180 and seventy percent (70%) diesel fuel 120, and so forth. Moreover, the ratios may change based upon operating conditions and other parameters herein.

Figure 5:
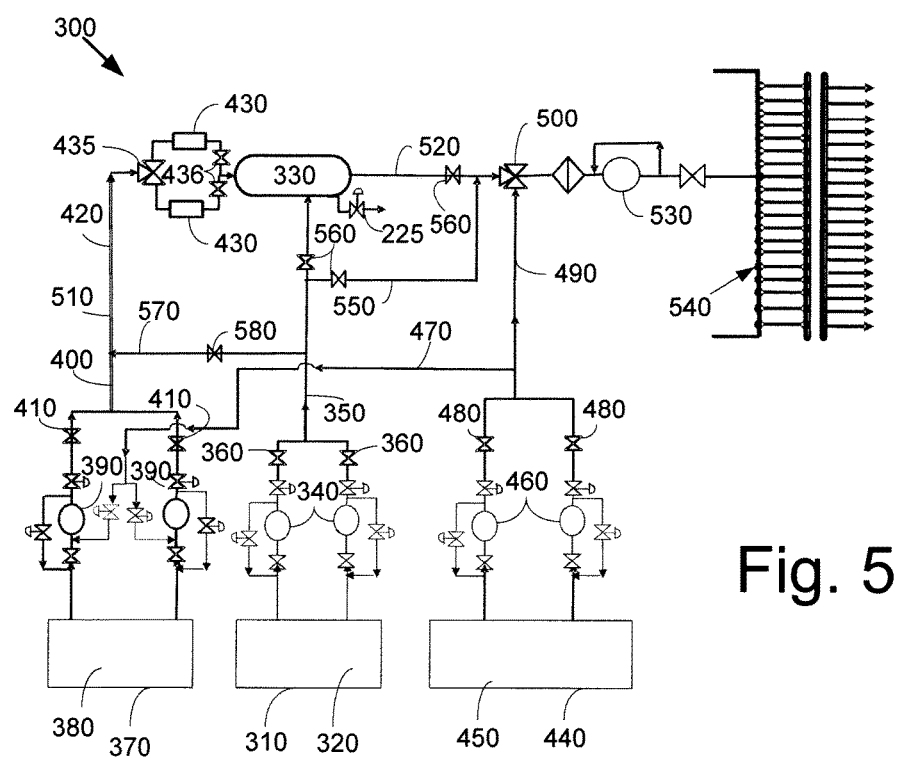
FIG. 5 is a schematic view of an alternative embodiment of a multiple fuel delivery system as may be described herein.

FIG. 5 shows a further embodiment of a multiple fuel delivery system 300 as may be described herein. The multiple fuel delivery system 300 may include a first fuel tank 310. The first fuel tank 310 may include a volume of a diesel fuel 320. The diesel fuel 320 may be a number two diesel fuel, a biodiesel fuel, and the like. Other types of fuels may be used herein. The first fuel tank 310 may have been a suitable size, shape, or configuration. The first fuel tank 310 may be in communication with a mixing chamber 330. The mixing chamber 330 may be similar to the mixing chamber 130 described above. The first fuel tank 310 may be in communication with the mixing chamber 330 via one or more first fuel pumps 340 on one or more first fuel lines 350. The first fuel pumps 340 may be of conventional design. A number of first fuel line isolation valves 360 may be used on the first fuel lines 350. Other components and other configurations may be used herein.

The multiple fuel delivery system 300 also may include a second fuel tank 370. The second fuel tank 370 may have a volume of a naphtha fuel 380 therein. Other types of fuels may be used herein. The second fuel tank 370 may have any suitable size, shape, or configuration. The second fuel tank 370 may be in communication with the mixing chamber 330 via one or more second fuel pumps 390 positioned on one or more fuel lines 400. The second fuel pumps 390 may be of conventional design. A number of second fuel line isolation valves 410 may be positioned on the second fuel lines 400. Other components and other configurations may be used herein.

Due to the nature of the naphtha 380, one or more of the second fuel lines 400 may include a cooling blanket 420 thereon. The cooling blanket 420 may be used for high ambient temperature locations. The one or more second fuel lines 400 also may include a number of strainers or filters 430 for the flow of naphtha 380. A three-way filter valve 435 and a pair of downstream filter valves 436 may be used to use one of the filters 430 at a time with the redundant filter 430 to ensure high system availability and operating reliability. Other components and other configurations also may be used herein.

The fuel delivery system 300 also may include a lubrication tank 440. The lubrication tank 440 may have a volume of a lubricity agent 450 therein. Various types of lubricity agents may be used herein. The lubrication tank 440 may have any suitable size, shape, or configuration. The lubrication tank 440 may be in communication with the second fuel lines 400 just upstream of the second fuel pumps 390. The lubrication tank 440 may be in communication with the second fuel lines 400 via one or more lubrication pumps 460 and one or more first lubrication lines 470. The lubrication pumps 460 may be of conventional design. A number of lubrication line isolation valves 480 may be positioned on the first lubrication lines 470. The lubrication tank 440 also may be in communication with or downstream of the mixing chamber 330 via a second lubrication line 490 and a three-way valve 500. Other types of joints and the like may be used herein to merge the flows. Varying volumes of the lubricity agent 450 may be used herein. Other components and other configurations may be used herein.

The flow of naphtha 380 and the first flow of the lubricity agent 450 thus may mix upstream of the second fuel pumps 390 to create a naphtha mixture 510. The naphtha mixture 510 may flow via the second flow lines 350 and the filters 430 to the mixing chamber 330. Likewise, the flow of the diesel fuel 320 may flow to the mixing chamber 330 via the first fuel lines 350. The naphtha mixture 510 and the flow of diesel fuel 320 may mix in the mixing chamber 330 in a manner similar to that described above. A blended flow 510 thus may exit the mixing chamber 330 and may be further mixed with an additional flow of lubricity agent 450 at the three-way valve 500 or elsewhere. The blended flow 520 may be pumped by a main fuel pump 530 to a flow divider 540 for combustion as described above. Other components and other configurations also may be used herein.

In use, if one hundred percent (100%) of the diesel fuel 320 is requested, then the fuel optimization controller 280 may instruct the first fuel pumps 340 to pump the diesel fuel 320 to the mixing chamber 330 and may instruct the main fuel pump 530 to pump the diesel fuel 320 to the flow divider 540. Alternatively, a by-pass line 550 may by-pass the mixing chamber 330 via a number of by-pass valves 560. If one hundred percent (100%) of the naphtha 380 is requested, the fuel optimization controller 280 may first instruct the lubrication pump 460 to pump the lubricity agent 450 to the second fuel lines 400 and/or the three-way valve 500 to compensate for the viscosity of the naphtha 380 as well as to mitigate possible corrosion to the main fuel pump 530 and the flow divider 540. Once the lubricity agent 450 is flowing adequately, the fuel optimization controller 280 then may instruct the second fuel pumps 390 to pump the naphtha 380 to the mixing chamber 330 and may instruct the main fuel pump 530 to pump the naphtha 380 to the flow divider 540.

If a blend of the diesel fuel 320 and the naphtha 380 is requested, naphtha is generally not utilized as a startup fuel. As such, the fuel optimization controller 280 may instruct the first fuel pumps 340 to pump the diesel fuel 320 to the mixing chamber 330 and may instruct the main fuel pump 530 to pump the diesel fuel 320 to the flow divider 540. The fuel optimization controller 280 then may instruct the lubricating pump 480 to pump the lubricity agent 450 to the second fuel lines 400 and/or the three-way valve 500. The fuel optimization controller 280 then may instruct the second fuel pumps 390 to pump the naphtha 380 to the mixing chamber 330. The diesel fuel 320 and the naphtha 380 may mix in the mixing chamber 330. The blended flow 520 then may be pumped to the flow divider 530 for combustion in the combustor cans 25. The blend of naphtha 380 to the diesel fuel 320 may be any proportion but generally may be in the range of about five percent (5%) to about twenty percent (20%) range. The proportions may change because of operating conditions or other parameters. Other components and other configurations may be used herein.

The multiple fuel delivery systems 100, 300 described herein thus provides the gas turbine engine with fuel flexibility to combust almost any number of different fuels and blends thereof. The multiple fuel delivery system 100 also may be combined with the multiple fuel delivery system 300 for further flexibility. Many different fuels may be used herein in any number of fuel tanks. A number of different cleaning techniques may be used herein to ensure that adequate removal of residual fuels as may be needed. For example, a flush line 570 with a flush valve 580 may extend from the first fuel line 350 to the second fuel line 400. A flow of diesel fuel 320 may be used to flush the naphtha mixture 510 out of the second fuel line 400 and the filters 430 and the like.

All of the pumps and valves described herein are redundant to provide for availability and reliability. Only one pump and valve combination may be in use at any given time. The fuel optimization controller 280 may monitor header pressures and flows in all lines leading to the main fuel pump 530 and elsewhere. The controller 280 thus may use this pressure and flow information to determine when to transfer to the available pumps for fuel or the lubricity agent 450 to the mixing chamber 330 for the predetermined system pressure and flow requirements. Likewise, the controller 280 may open and close the appropriate valves to purge the system when returning to the flow of only diesel fuel.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A multiple fuel delivery system for use with a gas turbine engine, comprising:
   a first fuel tank with a first fuel therein;
   a first plurality of fuel lines with first fuel pumps in communication with the first fuel tank;
   a second fuel tank with a second fuel therein;
   a second plurality of fuel lines with second fuel pumps in communication with the second fuel tank, wherein the first plurality of fuel lines and the second plurality of fuel lines merge into a common fuel line;
   a mixing chamber;
   the first fuel tank in communication with the mixing chamber via the first plurality of fuel lines;
   the second fuel tank in communication with the mixing chamber via the second plurality of fuel lines;
   a flow divider downstream of the mixing chamber; and
   a bypass line positioned about the mixing chamber, wherein the bypass line is configured to redirect the first fuel about the mixing chamber to the flow divider;
   wherein the mixing chamber comprises:

a first outer wall, a second outer wall transverse to the first outer wall, and a third outer wall parallel to the first outer wall;

a first inlet for the first fuel configured to inject the first fuel through the first outer wall in a flow direction;

a second inlet for the second fuel, the second inlet angled with respect to the first inlet and configured to inject the second fuel through the second outer wall against the flow direction; and an outlet at the third outer wall for a mixture of the first fuel and the second fuel that is aligned with the flow direction.

2. The multiple fuel delivery system of claim 1, wherein the first fuel comprises a diesel fuel and wherein the second fuel comprises a biodiesel fuel.

3. The multiple fuel delivery system of claim 1, wherein the second inlet of the mixing chamber comprises one or more angled counter flow nozzles that extend into the mixing chamber.

4. The multiple fuel delivery system of claim 1, further comprising a fuel optimization controller in communication with the first fuel pump, the second fuel pump, and a main fuel pump.

5. The multiple fuel delivery system of claim 1, wherein the flow divider comprises one or more fuel lines in communication with one or more combustion cans of the gas turbine engine.

6. The multiple fuel delivery system of claim 1, wherein a proportion of the first fuel to the second fuel ranges from about zero percent to one hundred percent.

7. The multiple fuel delivery system of claim 1, wherein a proportion of the second fuel to the first fuel ranges from about zero percent to one hundred percent.

8. A method of operating a multiple fuel delivery system for a gas turbine engine, comprising:

providing a volume of a first fuel via a first inlet positioned at a first outer wall of a mixing chamber;

providing a volume of a second fuel via a second inlet positioned at a second outer wall of the mixing chamber that is transverse to the first outer wall;

selecting a ratio of the first fuel and the second fuel;

pumping the ratio of the first fuel and the second fuel to a mixing chamber to create a blended flow, wherein the mixing chamber comprises:

the first inlet for the first fuel configured to inject the first fuel in a flow direction;

the second inlet for the second fuel, the second inlet angled with respect to the first inlet and configured to inject the second fuel against the flow direction; and an outlet for a mixture of the first fuel and the second fuel that is aligned with the flow direction, wherein the outlet is positioned at a third outer wall of the mixing chamber, wherein the third outer wall is transverse to the second outer wall; and pumping the blended flow to a flow divider for combustion in the gas turbine engine.

9. A multiple fuel delivery system for use with a gas turbine engine, comprising:

a first fuel tank with a first fuel therein;

a first plurality of fuel lines with first fuel pumps in communication with the first fuel tank;

a second fuel tank with a second fuel therein;

a second plurality of fuel lines with second fuel pumps in communication with the second fuel tank, wherein the first plurality of fuel lines and the second plurality of fuel lines merge into a common fuel line;

a mixing chamber with one or more angled counter flow nozzles to create a blended flow;

the first fuel tank in communication with the mixing chamber via the first plurality of fuel lines;

the second fuel tank in communication with the mixing chamber via the second plurality of fuel lines;

a flow divider downstream of the mixing chamber so as to provide the blended flow to a plurality of combustion cans of the gas turbine engine; and a bypass line positioned about the mixing chamber, wherein the bypass line is configured to redirect the first fuel about the mixing chamber to the flow divider;

wherein the mixing chamber comprises:

a first outer wall, a second outer wall transverse to the first outer wall, and a third outer wall parallel to the first outer wall;

a first inlet for the first fuel configured to inject the first fuel through the first outer wall in a flow direction;

a second inlet for the second fuel, the second inlet angled with respect to the first inlet and configured to inject the second fuel through the second outer wall against the flow direction; and an outlet at the third outer wall for a mixture of the first fuel and the second fuel that is aligned with the flow direction.

10. The multiple fuel delivery system of claim 9, wherein the first fuel comprises a diesel fuel and wherein the second fuel comprises a biodiesel fuel.

11. The multiple fuel delivery system of claim 9, further comprising a fuel optimization controller in communication with the first fuel pump, the second fuel pump, and a main fuel pump.

12. The multiple fuel delivery system of claim 9, wherein a proportion of the first fuel to the second fuel ranges from about zero percent to one hundred percent and/or a proportion of the second fuel to the first fuel ranges from about zero percent to one hundred percent.

* * * * *